Aug. 9, 1960   E. DOUCHET   2,948,648
SIMULATED STITCHING

Filed Dec. 8, 1955   3 Sheets-Sheet 1

Aug. 9, 1960    E. DOUCHET    2,948,648
SIMULATED STITCHING
Filed Dec. 8, 1955    3 Sheets-Sheet 2
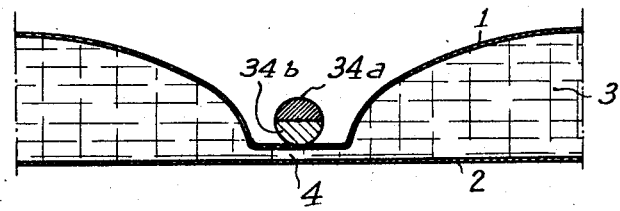
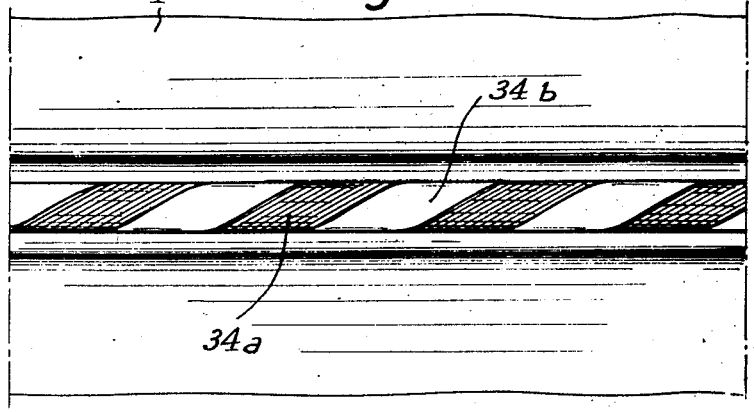
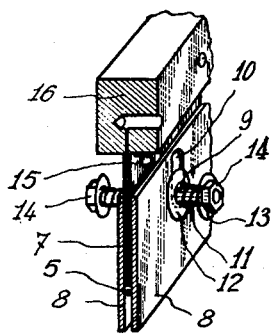

Aug. 9, 1960   E. DOUCHET   2,948,648
SIMULATED STITCHING
Filed Dec. 8, 1955   3 Sheets-Sheet 3
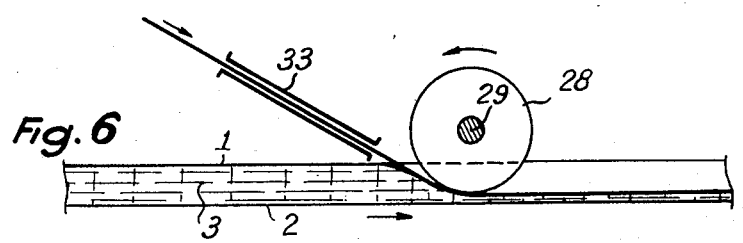
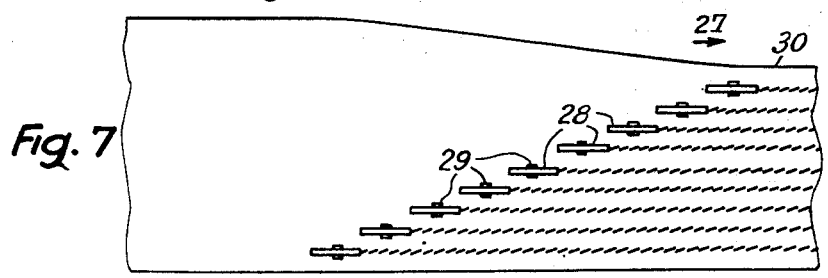
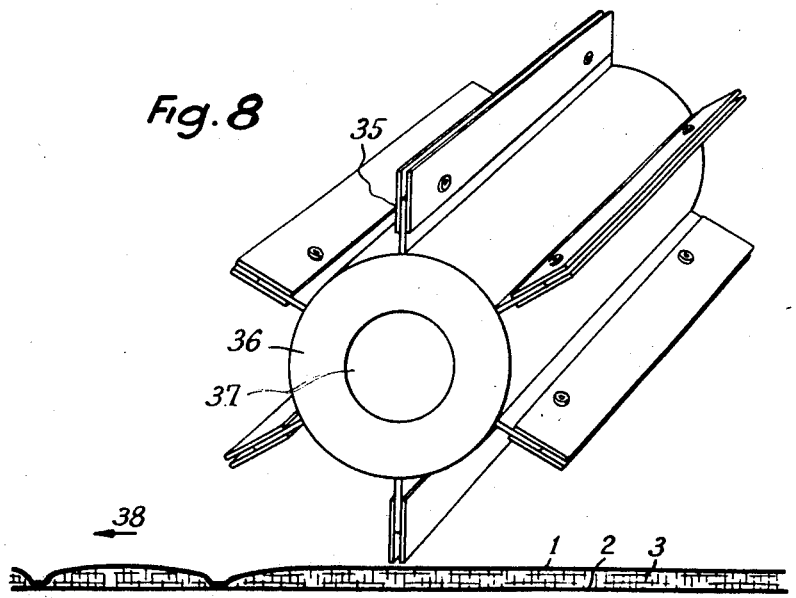

United States Patent Office

2,948,648
Patented Aug. 9, 1960

2,948,648

SIMULATED STITCHING

Eugene Douchet, Sarcelles, France, assignor of one-half to Society JOP, Sarcelles, and one-half to Société Taulet & Co., Villiers le Bel, France, both French societies Filed Dec. 8, 1955, Ser. No. 551,839

Claims priority, application Belgium Oct. 6, 1955

13 Claims. (Cl. 154—46)

The U.S. patent application Serial 516,889 discloses a plastic sheet assembly useful in various fields of production such as the manufacture of upholstered seats, morocco articles and the like, together with a device for producing said assembly.

This assembly comprises two sheets of plastic material having a suitable padding or stuffing interposed between them and bonded to each other along one or more lines, an elongated element of plastic material being bonded to the outer side of at least one of said sheets substantially along said lines, said element being preferably dyed in a color contrasting with the color as said outer side of said sheet.

The present invention has for its object to improve said assembly so as to have a perfect illusion of a saddler's stitch, the bonded assembly having the same appearance of it if it had been manufactured by machine stitching.

According to the invention, a twisted bicoloured cable is applied to the outer sheet at the position of each bond. This cable may comprise at least two threads, one of a first color and the other of a second color. The said cable may also comprise a single thread having one portion of a first color and another portion of a second color.

One of the threads or one of the portions of the single thread may be of the same colour as the outer sheet. The twisted cable thus give a perfect illusion of a saddler's stitch and the bonded assembly will have the same appearance as if it had been manufactured by machine stitching, but with the advantage that there are no needle perforations whereby it may be cleaned or washed without risk of deterioration.

The threads or the two portions of the single thread may also each be of different colours from the sheet. Thus, there may be obtained an imitation fancy stitch, for example, chain stitch.

This invention also provides apparatus for producing a bonded assembly comprising means for the application of a thread or cable which may be twisted or not.

According to one specific embodiment, this apparatus is characterised by a plurality of electrodes disposed to follow the generatrices of a rotatable cylinder which is caused to rotate at the same time as the assembly is displaced in a direction perpendicular to the axis of the cylinder, each of said electrodes comprising a plate adapted to bond the thread or threads to the outer sheet of the bonded assembly and at least one presser plate which is movable vertically with reference to said plate, for maintaining the thread laterally, and which bonds the the assembly at the sides of the thread, flexible means being provided to displace the presser plate downwardly with reference to the said plate in such a manner that its lower edge projects beyond that of the said plate.

In another embodiment of the invention the apparatus may comprise an assembly of grooved wheels or rollers for bonding, the said wheels or rollers having parallel axes but staggered from one edge of the assembly in the direction opposite to the direction of displacement of this assembly, each grooved wheel or roller having a median throat for the passage of the thread or threads and being followed by a member for guiding the thread or threads.

In order that the invention may be more clearly understood, reference will now be made to the accompanying drawings which show certain embodiments thereof by way of example, and which:

Fig. 3 is a sectional view of another embodiment of the bonded assembly.

Fig. 4 is a plan view corresponding to Fig. 3.

Fig. 6 shows in elevation a detail of the device of Fig. 5,

Fig. 7 shows a plan view of a modification of the disposition of the grooved wheels or rollers.

Fig. 8 is a perspective view of another device for manufacturing the assembly.

Fig. 9 is a perspective view partly in section illustrating a part of the bonding device.

Figure 1:
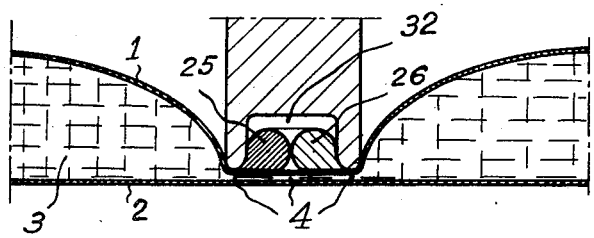
Fig. 1 shows a section on an enlarged scale of a first embodiment of the bonded assembly.
Figure 2:
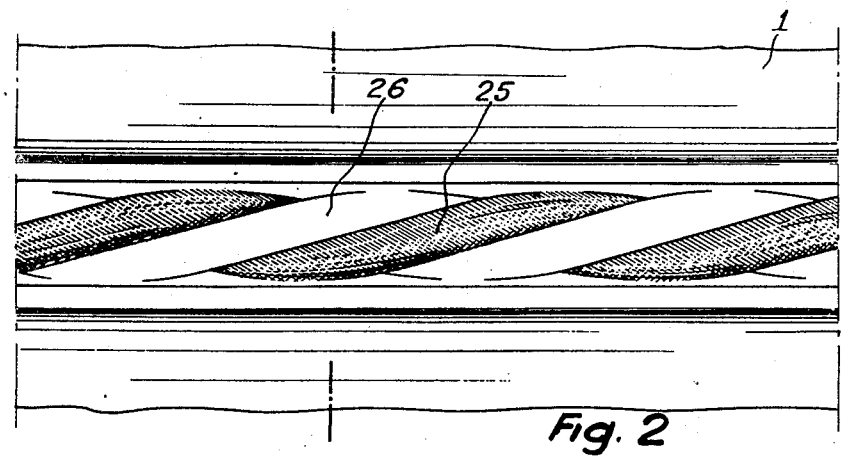
Fig. 2 is a plan view corresponding to Fig. 1.

As shown in Figs. 1 and 2, the assembly comprises two sheets of plastic material 1 and 2 between which there is provided a stiffening or padding layer 3, the two sheets being bonded one to the other as indicated at 4. Upon the sheet 1 at the position of the bonds 4 there is bonded a twisted thread or cable comprising two threads 25 and 26. The thread 25 has a colour different from that of the sheet 1; the thread 26 may have the same colour as this sheet in which case the two sheets appear to be bonded one to the other by machine stitching of the saddle stitch type, although the sheets, in fact, have no perforations at all. The thread 26 may also have a colour different from that of the sheet 1.

In the embodiment of Figs. 3 and 4, the twisted threads 25—26 are replaced by a single cable comprising two portions of different colors 34a and 34b and twisted about its axis.

Figure 5:
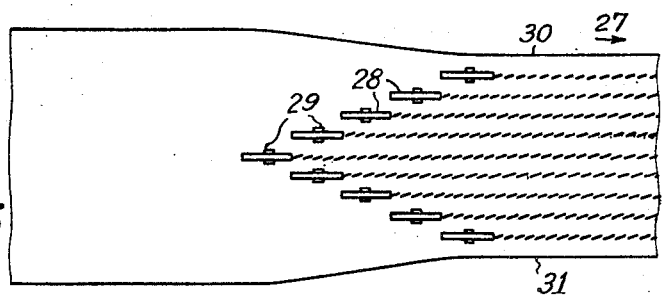
Fig. 5 is a plan view of a device for manufacturing the assembly.

In order to produce the bonded assembly according to the invention, the apparatus of Figs. 5 and 6 may be used in the case of rectilinear bonds. This apparatus which allows continuous production of a bonded assembly by displacing the assembly in the direction of the arrow 27 is constituted by an assembly of grooved wheels or rollers 28 whose axes 29 are parallel but staggered in the direction opposite that of the arrow 27 from the two edges 30 and 31 of the assembly, in such a manner that the wheels or rollers are disposed in two oblique rows with reference to the direction of the arrow 27 and meet substantially at the central longitudinal axis of the assembly. Each grooved wheel or roller has a central throat 32 (Fig. 1) in which the thread or the twisted threads is/are located and is followed by a thread guide 33.

At the time of producing the assembly, the apparent size of the sheet 1 decreases because it forms a succession of cylindrical portions.

In the laternative form shown in Fig. 7, the axes 29 of the grooved wheels or rollers 28 are simply staggered from the edge 30 in such a manner that the grooved wheels or rollers are located in a single row.

For producing the assembly, one may also use the device shown in Fig. 8, which comprises a plurality of electrodes shown in detail in Fig. 9 and indicated generally by 35. These electrodes are disposed to follow the generatrices of a cylinder 36 which is caused to rotate around its axis 37 at the same time as the assembly formed by the sheets 1 and 2 and the padding 3 is displaced in the direction 38 perpendicular to the axis of the cylinder.

Each electrode comprises (Fig. 9) a metal plate 7 which is sandwiched between a pair of spaced presser plates 8 which are connected for bodily movement together with respect to the intervening bonding plate 7. The presser plates 8 are resiliently urged into engagement with the opposite faces of plate 7 by an arrangement now to be described.

The electrode plate 7 is formed with holes (not shown in the drawing) and the presser plates 8 are formed with elongated slots 10 registering with said holes. Through the registering holes and slots there extend pins 9 having threaded ends with nuts 14 screwed thereon. Inner annular washers 12 are mounted on the pins 9 in engagement with the presser plates 8 and outer annular washers 13 are similarly mounted on the pins 9 in engagement with the nuts 14, the washers 12 and 13 being urged away from each other by coil springs 11 surrounding the pins. Means such as hair-pin springs 15, interposed between the presser plates 8 and a base 16 fast with the cylinder 36 and connected with the electrode plate 7 are provided for urging the presser plates in a downward direction with respect to the electrode plate 7 so that the lower ends of the presser plates will project beyond the lower ends of the electrode.

It will be apparent that the invention has been described only by way of example and that various modifications may be made to the specific details disclosed without in any way departing from its scope.

What I claim is:

1. The combination of plastic sheet material having an outer visible surface, and simulated stitching defined by an exposed, bicolored, plastic cable twisted about its longitudinal axis and extending along said surface and bonded, along its entire length, to said surface.

2. The combination of plastic sheet material having an outer visible surface, and simulated stitching defined by an exposed twisted, bicolored, plastic cable extending along said surface and bonded, along its entire length, to said surface, said bicolored cable having the two differently colored portions thereof arranged in intertwined helixes.

3. The combination of plastic sheet material having an outer visible surface, and simulated saddle stitching defined by an exposed twisted, bicolored, plastic cable extending along said surface and bonded, along its entire length, to said surface, said bicolored cable having the two differently colored portions thereof arranged in intertwined helixes with one of said portions being of the same color as said outer visible surface.

4. The combination of plastic sheet material having an outer visible surface, and simulated chain stitching defined by an exposed twisted, bicolored, plastic cable extending along said surface and bonded, along its entire length, to said surface, said bicolored cable having the two differently colored portions thereof arranged in intertwined helixes with the colors of said portions of the cable being each different than the color of said outer visible surface.

5. The combination of plastic sheet material having an outer visible surface, and simulated stitching defined by an exposed cable of two differently colored plastic threads twisted together to form intertwined helixes, said cable extending along said outer visible surface and being bonded along its entire length to said outer visible surface.

6. The combination as in claim 5, wherein one of said two differently colored threads has the same color as said surface so that saddle stitching is simulated.

7. The combination as in claim 5, wherein both of said two threads have colors different from that of said surface to simulate chain stitching on the latter.

8. The combination of plastic sheet material having an outer visible surface, and simulated stitching defined by an exposed plastic cable having differently colored diametrically opposed portions, said cable being twisted about its longitudinal axis, so that said differently colored portions form intertwined helixes of the respective colors, and being bonded along its entire length to said surface.

9. A material for upholstery comprising two layers of plastic sheet material having compressible padding interposed therebetween and bonded together along at least one line, and an exposed, bicolored plastic cable bonded, along its entire length, to one of said layers along said line, said bicolored cable being twisted about its longitudinal axis and having the differently colored portions thereof arranged in intertwined helixes to define simulated stitching.

10. A material as in claim 9; wherein said differently colored portions of the cable are defined by individual threads twisted together to form said intertwined helixes.

11. A material as in claim 9; wherein said cable is an integral elongated element having said differently colored portions at diametrically opposed sides thereof and forming said intertwined helixes by reason of the twist of said cable.

12. A material as in claim 9; wherein one of said differently colored portions is of the same color as said one layer so that said intertwined helixes simulate saddle stitching along said line.

13. A material as in claim 9; wherein both of said differently colored portions have colors different from that of said one layer so that said intertwined helixes simulate a row of chain stitching along said line.

References Cited in the file of this patent

UNITED STATES PATENTS

| | | |
|---|---|---|
| Re. 21,800 | Kahn et al. | May 13, 1941 |
| 445,228 | Middleton | Jan. 27, 1891 |
| 915,882 | Pianko | Mar. 23, 1909 |
| 1,263,734 | Bauer | Apr. 23, 1918 |
| 1,976,237 | Logan et al. | Oct. 9, 1934 |
| 2,338,375 | Donner | Jan. 4, 1944 |
| 2,537,323 | Wurzburger | Jan. 9, 1951 |
| 2,560,923 | Boersma et al. | July 17, 1951 |
| 2,569,434 | Ischinger | Sept. 25, 1951 |
| 2,576,621 | McBride et al. | Nov. 27, 1951 |
| 2,621,139 | Messing | Dec. 9, 1952 |
| 2,633,442 | Caldwell | Mar. 31, 1953 |
| 2,684,320 | Lyijynen | July 20, 1954 |
| 2,758,045 | Heaton et al. | Aug. 7, 1956 |
| 2,809,910 | Deddo | Oct. 15, 1957 |